United States Patent
Delbaere

(10) Patent No.: US 9,955,707 B2
(45) Date of Patent: May 1, 2018

(54) BOILED SUGAR SWEET COMPRISING NON-FRUCTOSYLATED α-GALACTOOLIGOSACCHARIDES

(75) Inventor: Francois Delbaere, Compiegne (FR)

(73) Assignee: OLYGOSE, Venette (FR)

( * ) Notice: Subject to any disclaimer, the term of this patent is extended or adjusted under 35 U.S.C. 154(b) by 845 days.

(21) Appl. No.: 14/115,786

(22) PCT Filed: May 28, 2012

(86) PCT No.: PCT/FR2012/051192
§ 371 (c)(1),
(2), (4) Date: Mar. 14, 2014

(87) PCT Pub. No.: WO2013/011216
PCT Pub. Date: Jan. 24, 2013

(65) Prior Publication Data
US 2014/0186513 A1 Jul. 3, 2014

(30) Foreign Application Priority Data
Jul. 19, 2011 (FR) ..................................... 11 56555

(51) Int. Cl.
*A23G 3/42* (2006.01)
*A23G 3/38* (2006.01)
*A23G 3/36* (2006.01)
*A23G 9/42* (2006.01)
*A23G 3/34* (2006.01)

(52) U.S. Cl.
CPC ................ *A23G 3/42* (2013.01); *A23G 3/38* (2013.01); *A23G 3/0019* (2013.01); *A23G 3/36* (2013.01); *A23G 9/42* (2013.01)

(58) Field of Classification Search
CPC .......... A23G 3/0019; A23G 3/38; A23G 3/42; A23G 3/346; A23G 9/42
USPC ................................................ 426/658, 660
See application file for complete search history.

(56) References Cited

U.S. PATENT DOCUMENTS

| | | |
|---|---|---|
| 4,497,846 A | 2/1985 | Boursier et al. |
| 5,314,701 A | 5/1994 | Mentink et al. |
| 5,314,708 A | 5/1994 | Gonze et al. |
| 5,470,591 A | 11/1995 | Ribadeau-Dumas et al. |
| 5,629,042 A * | 5/1997 | Serpelloni ............... A23G 3/04 426/548 |
| 2007/0154592 A1* | 7/2007 | Dauchy .................... A23G 1/00 426/3 |
| 2012/0121741 A1 | 5/2012 | Delbaere |

FOREIGN PATENT DOCUMENTS

| | | | |
|---|---|---|---|
| CA | 2299457 A1 | 2/1999 | |
| EP | 0 094 292 A2 | 11/1983 | |
| EP | 0 518 770 A1 | 12/1992 | |
| EP | 0 611 527 A1 | 8/1994 | |
| EP | 0 720 819 A2 | 7/1996 | |
| EP | 0 954 982 A1 | 11/1999 | |
| FR | 2 846 518 A1 | 5/2004 | |
| JP | 2012205503 A * | 10/2012 | |
| WO | 2007 017572 A1 | 2/2007 | |
| WO | 2010 109093 A1 | 9/2010 | |
| WO | WO 2010109093 A1 * | 9/2010 | ............. A61K 36/48 |

OTHER PUBLICATIONS

Qiang et al ("Health benefit application of functional oligosaccharides" Carbohydrate polymers 77(2009) 435-441), hereinafter Quiang.*
Database GNPD [Online] Mintel; Jun. 2011, Anonymous: "Sugar Syrup with oligosaccharide", XP002667896.
International Search Report for International Application No. PCT/FR2012/051192 dated Mar. 8, 2012.
A. Troszynska et al., "Antioxidant Activity of Pea (*Pisum sativum* L.) Seed Coat Acetone Extract," Lebensm.-Wiss. u.-Technol., 35, pp. 158-164 (2002).
Glenn R. Gibson, et al., "Dietary modulation of the human colonic microbiota: updating the concept of prebiotics", Nutrition Research Reviews, 17: pp. 259-275, 2004.
Ah-Reum Park, et al., "Galacto-oligosaccharide production using microbial beta-galactosidase: current state and perspectives", Applied Microbiology and Biotechnology, vol. 85, No. 5, Feb. 2010, pp. 1279-1286, XP002667897.

* cited by examiner

*Primary Examiner* — Jyoti Chawla
(74) *Attorney, Agent, or Firm* — Sughrue Mion, PLLC

(57) ABSTRACT

The present invention concerns a hard candy comprising a mixture of sugars composed of glucose and non-fructosylated α-galacto-oligosaccharides in particular proportions. It also concerns a method of manufacturing said candies, as well as the utilization, for manufacturing a hard candy, of a composition that includes the aforementioned mixture.

13 Claims, 1 Drawing Sheet

SOLE PLATE
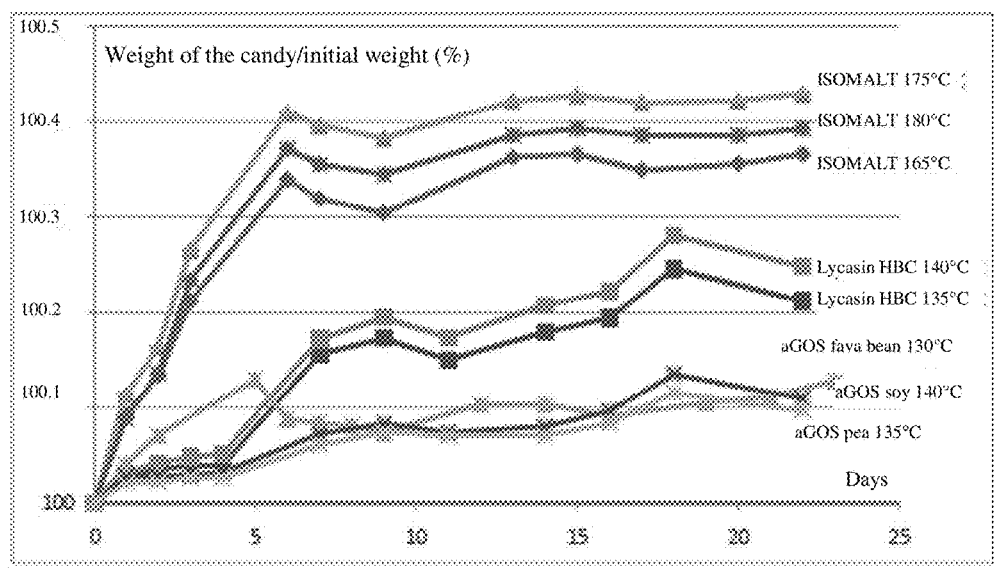

BOILED SUGAR SWEET COMPRISING NON-FRUCTOSYLATED α-GALACTOOLIGOSACCHARIDES

CROSS REFERENCE TO RELATED APPLICATIONS

This is a National Stage of International Application No. PCT/FR2012/051192 filed May 28, 2012, claiming priority based on French Patent Application No. 1156555 filed Jul. 19, 2011, the contents of all of which are incorporated herein by reference in their entirety.

TECHNICAL FIELD

The present invention concerns hard candies comprising a mixture of sugars composed of glucose and non-fructosylated α-galacto-oligosaccharides in particular proportions. It also concerns a method of manufacturing said candies, as well as the utilization, for manufacturing a hard candy, of a composition that includes the aforementioned mixture.

BACKGROUND OF THE INVENTION

Hard candies are generally obtained by dehydrating a syrup, cooking it at high temperature and possibly under low pressure, then forming a massecuite after adding flavors, colorants, etc. This is then poured while hot into a mold or cooled, formed into sausage shape, then stamped or cut in order to obtain a hard candy having a vitreous appearance.

The syrup used in manufacturing these candies can be composed of carbohydrates such as saccharose, dextrose, fructose, glucose syrup (starch hydrolysate comprising glucose, maltose and higher oligosaccharides) and their mixtures, or polyols such as sorbitol, maltitol syrups, mannitol, xylitol, isomalt, lactitol, hydrogenated starch hydrolysates (including maltitol) and their mixtures. Polyols make it possible to obtain candies having a low caloric yield and that are weakly cariogenic. However, because of their hygroscopic nature, they do not always enable candies to be manufactured that are stable over time. Candies obtained from said polyols, such as maltitol syrups, tend to absorb the ambient humidity, causing the liquefaction of their surface and making them sticky. Some of them also have a flow phenomenon that causes the deformation of the candy over time.

To remedy these problems, in particular, it has been suggested to adjust the maltitol content in the syrup (U.S. Pat. No. 5,314,708) or the composition of the hard candy in order to obtain a micro-crystallization of the surface, enabling the candy to be protected from humidity (EP 0 720 819). To avoid graining phenomena, it has also been proposed to add crystallization inhibitors to the massecuite, such as certain hydrogenated dextrins (EP 0 954 982) or crystallization propagation inhibitors, such as polydextrose (EP 0 611 527). However, it has been observed that, without hermetic packaging, candies obtained from these massecuites have an uncontrolled surface crystallization that alters their texture and the transparent or translucent nature of the candies, as well as a surface flow phenomenon that causes their softening. This is particularly the case for maltitol syrup available under the commercial name of LYCASIN® HBC from the company Roquette.

In the case of hydrogenated starch hydrolysates, it has also been suggested to reduce the water content and flow by adding to the massecuite compounds such as gum arabic or carboxymethyl cellulose, possibly with the addition of mannitol (EP 0 094 292), or to give the candies a particular multilayer structure (EP 0 518 770).

The most satisfactory solution to date to overcome the problems of water absorption and flow described above consists of manufacturing hard candies with an isomalt (or hydrogenated isomaltulose) base. In fact, these represent nearly 80% of the world market for hard candies. However, due to the low molecular weight of the isomalt, obtaining hard candies that are stable over time requires the aqueous isomalt solutions to be boiled in order to achieve a particularly low water content in the finished product. Now, this results in very high boiling temperatures, which increase the energy cost of the manufacturing process of the candies and also results in very long cooling times prior to forming the candies at 60-80° C. (particularly since the fusion heat of the melt is rather high), which also has a negative effect on the economy of the method. Moreover, said high boiling temperatures can be prejudicial to the stability of sensitive ingredients, such as vitamins, or flavors incorporated into the composition. Consequently, such items must be added to the melt after it has cooled.

Above all, this method results in isomalt-based melts having a viscosity that is insufficient for manufacturing candies by forming and not by molding. To increase their viscosity, the isomalt solutions are usually boiled in a vacuum at a lower temperature, which complicates the process. Another solution for increasing the viscosity of the isomalt-based massecuites, while preserving the stability of the hard candy in storage, was proposed in FR 2 846 518. It consists of replacing a portion of the isomalt with particular branched maltodextrins. However, such maltodextrins contribute strongly to the coloration of the syrups during the cooking of the candies, even at a low rate of incorporation.

Hydrogenated polydextrose-based hard candies are also available on the market. However, they have a bitter aftertaste that has slowed their commercial development. Furthermore, polydextrose is classified as a food additive (E1200 bulking agent) in the *Codex alimentarius*, so that it cannot be used in the preparation of hard candies "with no additives," which are more and more in demand by consumers desiring natural products.

There is therefore a need to propose a hard candy composition that makes it possible to manufacture, according to a simple method (in particular, not requiring the cooker to be in a vacuum, or the cooking temperature to be too high) having satisfactory productivity, hard candies that are non-cariogenic and have good organoleptic properties and a stability over time comparable to candies prepared with an isomalt base. It would also be desirable that these hard candies be able to be manufactured by forming and not only by molding.

Surprisingly, the inventors have discovered that these needs can be met by preparing hard candies from a composition including a special combination of galacto-oligosaccharides, particularly from legumes.

SUMMARY OF THE INVENTION

An object of the present invention is therefore a hard candy comprising a mixture of sugars composed of, in dry material:
  no more than 5% by weight of glucose and fructose,
  0 to 30% DP2,
  at least 30% by weight of DP3,
  no more than 60% by weight of DP4+, where DPn designates non-fructosylated α-galacto-oligosaccharides having a degree of polymerization equal to n and the percentages are expressed with respect to the weight of the mixture of sugars.

An object of the present invention is also the utilization, for manufacturing a hard candy, of a composition including the mixture of sugars described previously.

Another object of the present invention is a method of manufacturing hard candies, comprising:
a) the preparation of a composition including a mixture of sugars as described above and having a content of dry materials between 60 and 85% by weight, preferably between 70 and 80% by weight,
b) the cooking of the composition at a temperature of 130 to 150° C. at atmospheric pressure, or at a lower temperature in a vacuum,
c) the addition of one or more additives,
d) the recovery of the massecuite obtained upon completion of step (c),
e) the forming of the candies by molding or forming,
f) the cooling of the candies.

DETAILED DESCRIPTION

As previously indicated, the present invention concerns a hard candy that can be obtained from a mixture of sugars including no more than 5% by weight of glucose and fructose, the remainder being composed of the following non-fructosylated α-galacto-oligosaccharides (hereinafter designated as "α-GOS"):
from 0 to 30% DP2, such as melibiose, galactopinitol, galactinol and galactosyl-chiro-inositols, including the A1, A2, B1, B2 and B3 fagopyritols,
at least 30% by weight of DP3, such as manninotriose and ciceritol,
no more than 60% by weight of DP4-type compounds and higher oligosaccharides (designated together as DP4+), such as manninotetraose (also designated as verbascotetraose), having a formula $Gal_3$-Glc, or the product $Gal_4$-Glc, which can be obtained by defructosylation of ajugose, as well as their equivalents of larger size, with the general formula $Gal_n$-Glc.

where DPn designates non-fructosylated α-galacto-oligosaccharides having a degree of polymerization equal to n and the percentages are expressed with respect to the weight of the mixture of sugars.

In particular, such a mixture of sugars can be obtained from a source of legumes such as soy molasses, peas, chickpeas or fava beans.

In the case of peas, for example, the methods of separating the starch, proteins and fibers contained in the pea seeds (in particular, see WO 2007/017572) generate significant quantities of effluents composed of a soluble fraction of peas, also designated as "pea whey," traditionally used as fermentation substrates and in animal nutrition. Liquid concentrates or isolates of pea solubles are also commercially available from the company Hedimix under the commercial name "Erwteneiwit," from the company Emsland under the commercial name "Erbsen-Fruchtwasser" or from the company Roquette under the commercial name "Pea Solubles."

These different soluble fractions of peas contain soluble proteins, carbohydrates (simple sugars and oligosaccharides) and minerals, generally in the following proportions, by weight of dry material (which represents 24-30% by weight of this soluble fraction):

Proteins: 30-40%
Minerals: 14-16% (expressed in ash content), 65% of which is typically potassium chloride
Carbohydrates: 25-50%.

These can be used to produce the mixture of sugars used according to the invention. The general procedure is to centrifuge the pea solubles to obtain a clear juice (or supernatant) that is then subjected to a procedure for separating soluble peptides and proteins, particularly by ultrafiltration, then to successive steps of demineralization (by nanofiltration, electrodialysis or ion exchange), concentration, acid and/or thermal and/or enzymatic hydrolysis (for example by means of a yeast having an invertase activity, particularly from *Saccharomyces cerevisiae*) in order to defructosylate the oligosaccharides and eliminate monosaccharides, particularly by chromatography or nanofiltration, in order to obtain a mixture of sugars according to the invention that could be concentrated prior to use.

A method of this type was particularly described in application WO 2010/109093, to which reference can be made for more details. This method leads to a hydrosoluble extract of peas usable as a mixture of sugars according to the invention, characterized in that it includes, and preferably is essentially composed of, melibiose, manninotriose and manninotetraose in a ratio by weight of manninotetraose/melibiose of at least 1:1 and preferably at least 4:1 or at least 5:1 (and a maximum of about 10:1, for example) and/or a ratio by weight of manninotriose/manninotetraose of 0.3:1 to 4:1, and preferably 0.8:1 to 1:1.

Similar methods can be implemented from vegetable sources other than peas in order to produce the mixture of sugars used according to the invention.

This mixture of sugars is used, in step (a) of the method according to the invention, to prepare a composition having a content of dry materials between 60 and 85% by weight, preferably between 70 and 80% by weight. The purpose of this concentration is to ensure the microbiological stability of the syrup at ambient temperature, while maintaining a viscosity compatible with pumping. Lower concentrations can be considered, but would require the syrup to be stored at 4° C. This composition may only contain the aforementioned mixture and water. As a variant, it can also contain various additives, provided they do not degrade chemically or physically at the cooking temperatures used in step (b), which constitutes the crucial step of this method. Said cooking can be conducted at atmospheric pressure or in a vacuum. In the latter case, the temperature can be lowered by several tens of degrees compared to the temperature used at atmospheric pressure, which is a function of the oligosaccharides profile of the composition and is typically from 130 to 140° C. for methods of manufacturing molded candies and from 135 to 145° C. for methods of manufacturing formed candies. Suitable cooking temperatures can be easily determined by a person skilled in the art by means of simple, routine operations. The other steps of the method set forth above are quite conventional and similar to those used in manufacturing hard candies with a saccharose/glucose syrup mixture base, considered as the standard of reference for candy makers.

In particular, among the additives that can be added to the composition in step (c) and/or included in the composition in step (a) are intense sweeteners such as *Stevia* extracts, aspartame, acesulfame K and sucralose, as well as colorants, flavorings, antiseptic or antibiotic active ingredients, for example, and mixtures thereof.

This method can be implemented continuously, in batches or semi-continuously, in equipment conventionally used in confectionery.

It is obvious that the method according to the invention can be modified to include additional intermediate steps, provided they do not hinder obtaining candies having good organoleptic properties. In particular, it can be adapted conventionally for a person skilled in the art to obtain coated or multi-layer candies.

The advantage of the method according to the invention is that it makes it possible to obtain hard candies by forming and possibly by molding, without having to resort to high cooking temperatures followed by long cooling times, nor does it require cooking the composition under vacuum. On the contrary, this method uses relatively low cooking temperatures that result in melts that are viscous enough to be molded into shapes without the need for long cooling. Thus, it has been shown that the composition used according to the invention, adjusted to a content of dry materials from 70 to 75% by weight, has a viscosity allowing the formation of candies by forming after cooking at at least 150° C. at atmospheric pressure, and possibly by molding after cooking at at least 140° C. at atmospheric pressure.

Furthermore, the candies obtained have a hard, non-sticky surface after manufacturing, unlike candies with an isomalt base that have a higher water absorption after manufacturing and therefore need to be stored under controlled temperature and humidity conditions for 24 hours in order to reduce their stickiness. Because of their low hygroscopicity, these candies can also be packaged in a box or bag, for example, without the need for individual wrapping.

In particular, the candies according to the invention have the following characteristics:
- an increase in their water absorption, after a period of five days in storage, unwrapped, at 20-25° C. after they are manufactured, of less than 0.15%, even less than 0.1%, the water absorption being expressed by the variation in weight of the sample with respect to its initial weight, and/or
- a hard, non-sticky surface texture after 24 days of storage, unwrapped, at 20-25° C., and/or
- a glass transition temperature (Tg), measured by DSC, of more than 35° C., preferably more than 40° C., or even 45° C., and/or
- a water content, measured by the Karl-Fischer method, just after cooling and/or after 24 days, of between 3 and 6%.

These hard candies can be used in the food or pharmaceutical domain, particularly as lozenges for the throat.

Moreover, they offer an excellent source of fiber and good intestinal tolerance and can therefore be used as a prebiotic agent.

"Prebiotic" is understood here as being a non-digestible, selectively fermented food component that induces specific changes in the composition and/or activity of the intestinal microflora, providing benefits to the health and well-being of the host (Gibson G R et al., Nutrition Research Reviews, 17: 259-275, 2004). In particular, prebiotics can be considered as food for beneficial bacteria of the colon, such as bifidobacteria and lactobacilli, which make it possible to prevent intestinal problems, improve absorption of minerals, modulate lipid metabolism, and/or stimulate the immune system.

The invention will now be illustrated by the following non-limiting examples, taken in combination with the appended FIGURE that illustrates the water absorption curve of candies according to the invention and according to the prior art.

EXAMPLES

Example 1: Manufacture and Sensory Evaluation of Hard Candies According to the Invention Hard candies were prepared from different mixtures of sugars from legumes, according to the general method described above, and having the following compositions (in percentages by weight):
- Soy base: 0% DP1; 24% DP2; 76% DP3; 0% DP4+
- Pea base: 0% DP1; 7% DP2; 48% DP3; 45% DP4+
- Chickpea base: 0% DP1; 6% DP2; 88% DP3 (of which ciceritol=64%); 6% DP4+
- Fava bean base: 0% DP1; 7% DP2; 30% DP3; 63% DP4+,
- Where DP1 designates glucose and DP2, DP3 and DP4+ designate respectively non-fructosylated alpha-oligosaccharides with a degree of polymerization equal to 2, equal to 3 and greater than or equal to 4.

The cooking was done on a hot plate. The cooking tests were begun at 115° C. for all syrups, then the temperature was increased in 5° C. stages until reaching the lowest temperature at which the candies could be molded. The temperature was then increased again in order to obtain a rather viscous mass for manufacturing candies by forming. The candies thus obtained were evaluated visually and by touch in order to evaluate their stickiness and their hardness after 24 days of storage, unwrapped, at 25° C. The evaluation of the more or less hard texture of the surface of the candies was done by exerting a slight pressure on the surface with a stainless-steel spatula.

Candies prepared in the same way from Lycasin® HBC and Isomalt were used as controls.

The results of these evaluations are shown in Table 1 below. It can be seen from this table that α-GOS-based syrups according to the invention allow candies to be obtained by forming at a lower temperature than those prepared from syrups from the prior art. Moreover, the candies thus obtained are just as hard and just as non-sticky as those of the prior art.

Example 2: Water Absorption Test

Two samples were evaluated from each of the molded candies obtained as described in Example 1 and preserved for 24 days, unwrapped, at 25° C. Each candy was weighed after manufacture, then every day for four days, and finally every two or three days. FIG. 1 shows the results obtained for the candies judged to be hard and non-sticky or slightly sticky, according to Example 1.

It can be observed in this FIGURE that in the beginning, the isomalt candies have significant water absorption, which then completely stops. This phenomenon is well known to a person skilled in the art, and corresponds to the water absorption necessary for the formation of surface crystals that quickly form a very effective protection against water absorption. A similar phenomenon can be observed with the Lycasin® HBC, with a quick absorption of water at the beginning, then a slowdown, but unlike the isomalt, a certain hygroscopicity is maintained throughout storage, which contributes to a softening of the candies.

On the contrary, α-GOS-based candies according to the invention show very weak hygroscopicity, which results in a lower water absorption than what was obtained with candies of the prior art, but this does not seem to be due to the formation of a crystalline layer on the surface, which remains perfectly shiny, unlike candies of the prior art.

TABLE 1

| Syrup used | Molding temperatures | Forming temperatures | Sticky | Hardness (texture) |
|---|---|---|---|---|
| Lycasin ® HBC | 120-150° C. | 150-155° C. | 120-130° C.: melted<br>135° C.: sticky<br>140° C.: slightly sticky<br>145-155° C.: non-sticky | Soft or pliable |
| Isomalt | 120-190° C. | 190° C. | 120-135° C.: melted<br>140-150° C.: sticky<br>155° C.: slightly sticky<br>160-190° C.: non-sticky | 140-155° C.: pliable<br>160-180° C.: rather hard<br>185-190° C.: hard |
| Soy base | 120-140° C. | 140-145° C. | 120-130° C.: melted<br>135° C.: sticky<br>140° C.: slightly sticky<br>145° C.: non-sticky | 135° C.: pliable<br>140° C.: rather hard<br>145° C.: hard |
| Chickpea base | 120-135° C. | 135-140° C. | 120-125° C.: melted<br>130° C.: sticky<br>135° C.: slightly sticky<br>140° C.: non-sticky | 130° C.: pliable<br>135° C.: rather hard<br>140° C.: hard |
| Pea base | 120-130° C. | 130-140° C. | 120° C.: melted<br>125° C.: sticky<br>130° C.: slightly sticky<br>135-140° C.: non-sticky | 125° C.: pliable<br>130° C.: rather hard<br>135-140° C.: hard |
| Fava bean base | 120-125° C. | 125-135° C. | 120° C.: melted<br>125° C.: sticky<br>130° C.: slightly sticky<br>135° C.: non-sticky | 125° C.: pliable<br>130° C.: rather hard<br>135° C.: hard |

Example 3: Measuring the Glass Transition Temperature

Glass transition temperature (Tg) analyses were carried out by DSC on two samples of stable candies obtained according to Example 1, from compositions according to the invention having different DPn profiles, situated at the extremes of the ranges described previously.

The Tg measurement makes it possible to predict the behavior of the candies at their usual storage temperature. Indeed, when the Tg is lower than the storage temperature, a cold-flow phenomenon is observed, which can occur even in the absence of absorption of water.

The results of these measurements are presented in Table 2 below.

TABLE 2

| Syrup used | Cooking temperature (° C.) | Tg (° C.) |
|---|---|---|
| Fava bean base | 135 | 46.2 |
| Soy base | 145 | 47.2 |

It therefore appears that candies obtained from α-GOS compositions according to the invention have a Tg higher than 40° C., which makes it possible to discard any risk of cold flow and guarantees that these candies will preserve the hard surface during storage.

Example 4: Recipes for Candies According to the Invention

Hard candies having the following composition were prepared in a manner that is conventional for a person skilled in the art:

| Red/plum fruit-flavored candies | |
|---|---|
| Soy base 1[(1)] | 50 g |
| Citric acid monohydrate | 175 mg |
| Red fruit flavoring | 110 mg |

-continued

| Red/plum fruit-flavored candies | |
|---|---|
| Plum flavoring | 130 mg |
| Natural carmine coloring | 70 g |
| Intense sweetener[(2)] | 10 mg |

[(1)]According to Example 1
[(2)]OnlySweet FAKW 945 Stevia modifyer (WILD FLAVORS INC.)

| Grapefruit-flavored candies | |
|---|---|
| Pea base[(3)] | 50 g |
| Citric acid monohydrate | 350 mg |
| Grapefruit flavoring | 150 mg |
| Natural coloring | 10 mg |
| Intense sweetener[(4)] | 10 mg |

[(3)]According to Example 1
[(4)]OnlySweet FAKW 945 Stevia modifyer (WILD FLAVORS INC.)

The oligosaccharide syrups were cooked at 155° C., before adding the citric acid, sweetener, flavoring and coloring, and the mixture was poured into molds. The candies obtained weighed approximately 3.5 g and included from 76 to 93% fiber for a caloric value of less than 8 cal/candy.

The invention claimed is:

1. A hard candy comprising a mixture of sugars comprising, in dry material:
   no more than 5% by weight of glucose and fructose,
   0 to 30% DP2,
   at least 30% by weight of DP3,
   no more than 60% by weight of DP4+,
   where DPn designates non-fructosylated α-galacto-oligosaccharides having a degree of polymerization equal to n and the percentages are expressed with respect to the weight of the mixture of sugars.

2. The candy according to claim 1, wherein the candy is obtained from a legume source.

3. The candy according to claim 1, comprising at least one of:

an increase in water absorption, after a period of five days in storage, unwrapped, at 20-25° C. after being manufactured, of less than 0.15%, the water absorption being expressed by the variation in weight of the sample with respect to its initial weight, or a hard, non-sticky surface texture after 24 days of storage, unwrapped, at 20-25° C., or a glass transition temperature (Tg), measured by DSC, of more than 35° C., or a water content, measured by the Karl-Fischer method, just after cooling or after 24 days, of between 3 and 6%.

4. A composition for the manufacture of hard candy, including a mixture of sugars composed, in dry material, of:
no more than 5% by weight of glucose,
0 to 30% DP2,
at least 30% by weight of DP3,
no more than 60% by weight of DP4+,
where DPn designates non-fructosylated α-galacto-oligosaccharides having a degree of polymerization equal to n and the percentages are expressed with respect to the weight of the mixture of sugars.

5. The candy according to claim 2, comprising at least one of:
an increase in water absorption, after a period of five days in storage, unwrapped, at 20-25° C. after being manufactured, of less than 0.15%, even less than 0.1%, the water absorption being expressed by the variation in weight of the sample with respect to its initial weight, or a hard, non-sticky surface texture after 24 days of storage, unwrapped, at 20-25° C., or a glass transition temperature (Tg), measured by DSC, of more than 35° C., or a water content, measured by the Karl-Fischer method, just after cooling or after 24 days, of between 3 and 6%.

6. The candy according to claim 2, where the legume source is at least one of soy molasses, peas, chickpeas or fava beans.

7. The candy according to claim 3, wherein the increase in water absorption, after a period of five days in storage, unwrapped, at 20-25° C. after being manufactured, is less than 0.1%.

8. The candy according to claim 3, wherein the glass transition temperature (Tg), measured by DSC is more than 40° C.

9. The candy according to claim 3, wherein the glass transition temperature (Tg), measured by DSC is more than 45° C.

10. The candy according to claim 5, wherein the glass transition temperature (Tg), measured by DSC is more than 40° C.

11. The candy according to claim 5, wherein the glass transition temperature (Tg), measured by DSC is more than 45° C.

12. A method of manufacturing hard candies according to claim 1, comprising:
a) the preparation of a composition including a mixture of sugars as described in claim 1, said composition having a content of dry materials between 60 and 85% by weight,
b) the cooking of the composition at a temperature of 130 to 150° C. at atmospheric pressure, or at a lower temperature in a vacuum,
c) the addition of one or more additives,
d) the recovery of the massecuite obtained upon completion of step (c),
e) the forming of the candies by molding or forming,
f) the cooling of the candies.

13. The method according to claim 12, wherein the cooking temperature is between 130 and 140° C. for the methods of manufacturing molded candies and between 135 and 145° C. for the methods of manufacturing formed candies.

* * * * *